United States Patent Office 2,921,596
Patented Jan. 19, 1960

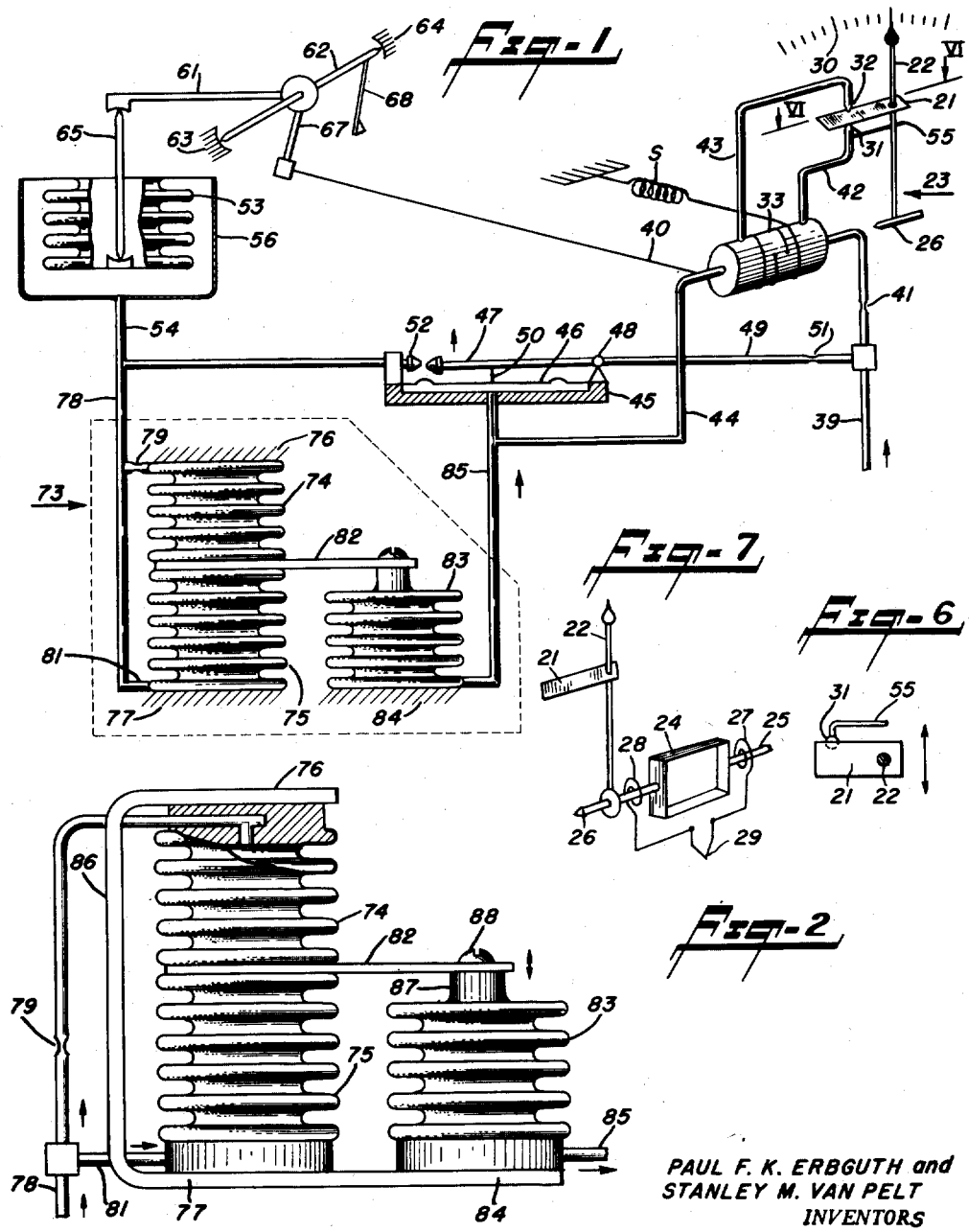

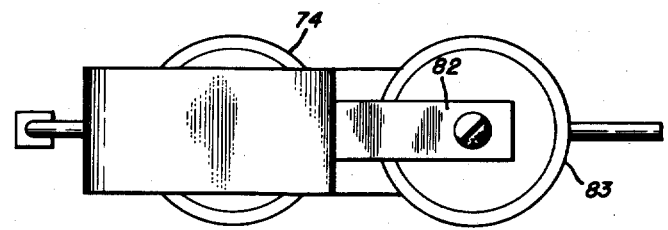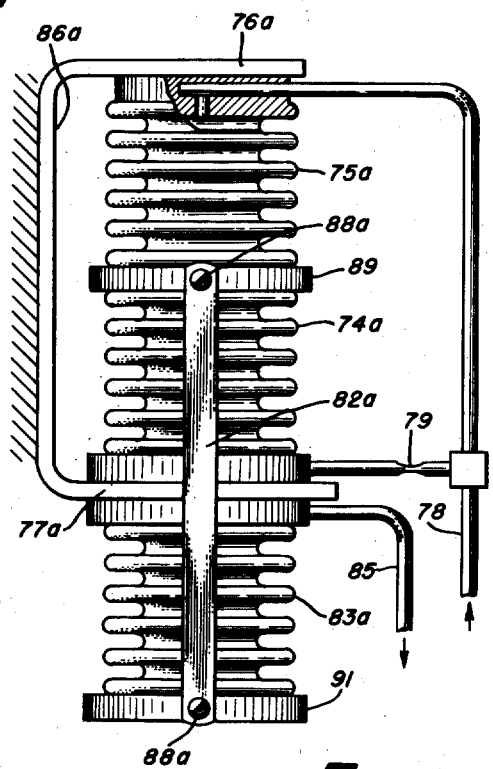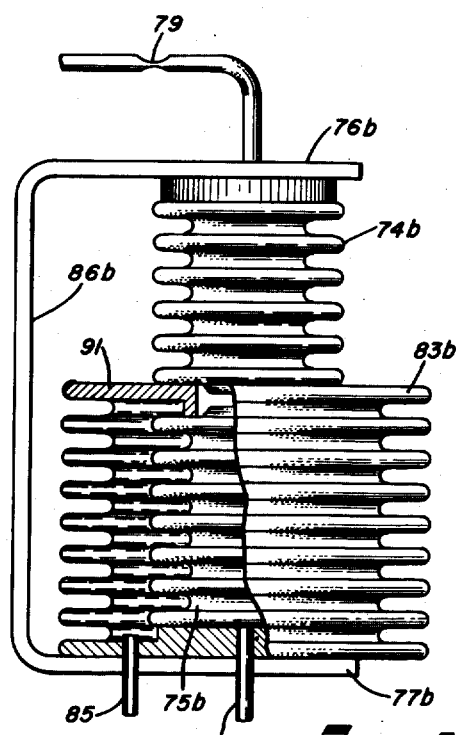

2,921,596

ELECTRO-PNEUMATIC VANE AND BELLOWS SYSTEM WITH FEEDBACK ARRANGEMENT

Paul F. K. Erbguth, Great Neck, N.Y., and Stanley M. Van Pelt, Nixon, N.J., assignors, by mesne assignments, to Daystrom, Incorporated, Murray Hill, N.J., a corporation of New Jersey Application November 21, 1955, Serial No. 548,082

13 Claims. (Cl. 137—85)

This invention relates to pneumatic systems wherein changes in a variable condition cause corresponding variations in air pressure to effectuate the operation of indicating, recording and/or control means and, more particularly, to a novel feedback arrangement including a pneumatically connected auxiliary bellows mechanically connected to a feedback bellows, to eliminate oscillations and increase system stability.

Our novel feedback arrangement is adapted for use generally in pneumatic systems but the following description will be restricted to such arrangement forming part of a pneumatic follow-up system. Such system comprises a device sensitive to changes in a variable condition, as for example, an electrical instrument having a pointer operated over a scale and actuated by electrical energy, a pivoted beam unbalanced by changes in weight or humidity, or the like. The movement of such condition sensing device alters the position of a vane, in a stream of low pressure air, positioned between axially aligned nozzles. The variation in the air pressure in the receiving nozzle actuates an air relay which, in turn, produces a corresponding pressure variation in a relatively high air pressure system. Such variation in the air pressure output of the relay is utilized to actuate suitable mechanism to provide a measurement and/or record of the instantaneous state of the condition, or to effect the control of the condition at a selected point. The system is self-balancing, in that any change in the variable condition results in a corresponding follow-up action to maintain the vane substantially in its initial, or throttling, position in the air stream.

In general, any follow-up system may be subject to cycling or hunting at the balancing point due to the time lag between the input signal and the effect of the follow-up action.

An object of this invention is to increase the stability of a pneumatic system responsive to changes in a variable condition, by the provision of a pneumatic feedback unit that is responsive to the rate of change of the condition.

An object of this invention is the provision of a pneumatic system responsive to changes in a variable condition and including a primary bellows actuated by variations in the output air pressure of an air relay, auxiliary bellows pneumatically coupled to the primary bellows, and a feedback bellows mechanically coupled to the auxiliary bellows, said feedback bellows being arranged to develop an air pressure change opposed to that resulting in actuation of the primary bellows.

An object of this invention is the provision of a pneumatic system responsive to changes in a variable condition and comprising an air relay actuated upon changes in the condition to produce a corresponding pressure variation in an air line, a primary bellows movable in response to the pressure variations in said line, auxiliary bellows pneumatically coupled to the primary bellows, a feedback bellows mechanically coupled to the auxiliary bellows, and an air line connection between the feedback bellows and the air relay, said feedback bellows being arranged to develop air pressure variations opposed to those which actuate the air relay.

An object of this invention is the provision of a pneumatic system responsive to changes in a variable condition and comprising a sensing member movable in accordance with changes in the condition, axially-aligned discharge and receiving nozzles, means normally maintaining an air stream between the nozzles, a vane actuated by the sensing member to inhibit more or less the quantity of air passing to the receiving nozzle, an air relay having an actuating chamber connected to the receiving nozzle, a primary bellows controlled by the air relay, auxiliary bellows coupled to the primary bellows, a feedback bellows driven by the auxiliary bellows, and a tube for feeding the output signal of the feedback bellows in proper phase relation to the low pressure side of the relay in order to eliminate system oscillation and increase system stability without sacrificing system response.

These and other objects and advantages will become apparent from the following description of the invention when taken with the accompanying drawings. It will be understood, however, that the drawings are for purposes of illustration and are not to be construed as defining the scope or limits of the invention, reference being had for the latter purpose to the claims appended hereto.

In the drawings wherein like reference characters denote like parts in the several views:

Figure 1 is a diagrammatic view of the pneumatic circuits in an instrument embodying our invention;

Figure 2 is a fragmentary detailed view of the feedback system of Figure 1;

Figure 3 is a plan of the feedback system of Figure 2;

Figure 4 is a view corresponding to Figure 2, but showing a modification;

Figure 5 is a view also corresponding to Figure 2, but showing another modification;

Figure 6 is a horizontal sectional view on the line VI—VI of Figure 1, in the direction of the arrows, parts being shown in plan.

Figure 7 is a diagrammatic view of the actuating mechanism for the pointer shown in Figure 1.

In the instrument illustrated in Figure 1, which includes a self-balancing system involving mechanism for sensing changes in a variable condition, there is a vane 21 carried by a lever 22 (which in this instance is the pointer of a low torque sensing device, for example, a sensitive electrical instrument such as a millivoltmeter, generally designated 23) and movable over a suitable scale 30. This figure being diagrammatic shows only the shaft or pivot portion 26 of the instrument which, as shown in Figure 7, carries the conventional coil 24, rotatably mounted on shafts or pivots 25, 26, between the poles of a permanent magnet, not shown. Those skilled in this art will understand that the movable coil is mounted for angular rotation in a unidirectional magnetic flux gap so formed and hair springs 27, 28 are provided, whereby the coil is held in a given or zero position until electrical current is passed therethrough. Such current may, for example, be generated by a thermocouple 29 serving as a temperature measuring device in a furnace (not shown).

The follow-up mechanism comprises a pair of axially-aligned nozzles, namely, a supply or discharge nozzle 31 and a receiving nozzle 32. These nozzles form a pneumatic couple and are mounted for rotation coaxially with respect to the shaft 26. The nozzles are desirably carried by a coupling 33 mounted for rotation on pivots (not shown), but corresponding generally with those of the coupling similarly identified in co-pending United States patent application Serial No. 492,823, filed March 8, 1955, in the names of R. Langford and S. Van Pelt, and entitled "Pneumatic System With Feedback Arrangement." The coupling 33 is biased in a given direction as by means of a spring S having one end secured to a relatively fixed surface and the other end attached to a flexible wire secured to the coupling. A similar wire 40 has one end entwined about and fastened to the coupling 33, and the other end fastened to a rigid arm 67, or crank on a shaft 62.

The construction of the coupling 33 so as to afford a transfer of air from the discharge nozzle to the receiving nozzle while permitting free rotation of the coupling, is described in the co-pending application of P. F. K. Erbguth, Serial No. 492,930, filed March 8, 1955, and entitled "Pneumatic Follow-up System," now Patent Number 2,838,028, except that the air flow is in a direction reverse to that of the present case. However, one skilled in the art will know that the pneumatic follow-up coupling device of said pending application may be used as a feature of the present case by merely reversing the flow of air therethrough.

Air under pressure, from tube 39, including pressure-reducing restrictor 41, is supplied from the discharge nozzle 31 to the receiving nozzle 32, except as inhibited by the vane 21. The receiving nozzle 32 is connected to the actuating chamber of an air relay 45 by the tubes 43 and 44, such chamber being closed by a diaphragm 46. It will be apparent that the diaphragm will move in response to changes in the air pressure within the tube 44, as determined by the quantity of air passing to the receiving nozzle 32.

The air relay 45 may be of conventional construction and is here shown as comprising a nozzle tube 47 pivoted at 48 and connected to the relay diaphragm 46 by a link 50. Air under pressure from tube 39 is supplied to the nozzle tube 47 through a tube 49 which may have a restrictor 51 therein. It may here be pointed out that the air supplied to the relay nozzle 47 has a pressure in the range of pounds per square inch to effect a positive operation of suitable follow-up mechanism, as will be described in detail hereinbelow. On the other hand, the pressure of the air supplied to the rotatable discharge nozzle 31 is very low, that is, not more than three inches of water, thereby reducing to a minimum any reaction between the air stream and the vane 21 carried by the low torque sensing device 23.

Cooperating with the pivoted nozzle tube 47 of the air relay 45 is a fixed receiving nozzle 52 communicating with a relatively large primary or main bellows 53 through tube 54. The bellows 53, as well as the bellows to be subsequently described, is desirably the type formed of bronze or other suitable non-rusting resilient metal. The bottom of this main bellows 53 is connected to a crank 61 extending desirably at right angles from the shaft 62 pivoted in bearings 63 and 64, as by means of a connecting rod 65. The shaft 62 also carries the crank or arm 67, also desirably extending at right angles thereto, which is connected to the coupling 33 by means of the wire 40 for balancing and operating the same against the bias of the spring S. The shaft 62 may also operate an arm 68 carrying a pen cooperating with a movable chart (not shown) to form a recorder.

Associated with the main bellows 53 is a feedback system, generally designated 73. This feedback system comprises a bellows device, desirably in the form of a pair of auxiliary bellows 74 and 75 mounted in tandem and operating between fixed abutments 76 and 77. These auxiliary bellows are pneumatically coupled to the tube 54, and consequently to the primary bellows 53, by the tube 78. One branch of the tube 78 goes through a flow resistor 79 to the "restricted" bellows 74, and the other branch 81 is unrestrictedly connected to the "free" bellows 75. These auxiliary bellows have mounted therebetween an arm 82 connected to one end of a feedback bellows 83. This feedback bellows is connected to the low pressure line 44, and consequently to the relay 45, by a tube 85, whereby the output of said feedback bellows modifies the input to the relay 45.

The operation of the system will now be described. It will be assumed to be in balance, under which condition the leading edge of the vane 21 is disposed substantially in the center of the air stream as shown in Figure 6. Upon an up-scale movement of the pointer 22, that is, clockwise as with the free end of the pointer moving to the right as viewed in Figure 1, the vane will be moved further out of the air stream, permitting more air to flow into the receiving nozzle 32, whereupon the air pressure in the tubes 43, 44, and in the air relay chamber is increased. Such increase in air pressure results in upward deflection of the air relay diaphragm 46, thereby moving the nozzle 47 farther into alignment with the associated fixed nozzle 52.

This results in an increase in the air pressure within the chamber 56 surrounding the primary bellows 53, causing an upward movement of that bellows. Inasmuch as the primary bellows is mechanically linked to the shaft 62 by the connecting rod 65 and crank 61, there results a positive corresponding clockwise rotation of the shaft 62 against the bias S of the spring of the coupling 33. The rotation of the arm 67 pulls the wire 40, thereby rotating the coupling 33 in a clockwise direction until the vane 21 is overtaken and is again substantially in its initial, or throttling, position within the air stream, that is, where a new balance obtains.

A down-scale movement of the pointer 22, or one to the left as viewed in Figure 1, results in the vane 21 being moved further into the air stream, additionally restricting the air flow into the receiving nozzle 32, whereupon the air pressure in the tubes 43, 44, and in the air relay chamber is decreased. This reverse operation, whereby the arm 67 and the wire 40 are released, effects a counter-clockwise rotation of the aligned nozzles and allows them to follow the pointer. In order to prevent movement of the vane 21 beyond the air stream upon a down-scale deflection of the pointer, a suitable stop 55 is secured to the nozzle 31.

The actuation of the bellows 53 as previously described is modified and moderated by the simultaneous operation of the feedback system 73. That is, upon the pressure increasing in the tube 78, there results a momentary expansion of the auxiliary bellows 75, overcoming the tendency of the bellows 74 to expand because of the slowing action of the restrictor 79. This means that the arm 82 moves upwardly, as viewed in Figure 1, expanding the feedback bellows 83 and correspondingly decreasing the pressure therein and in the connecting tube 85. This results in a momentary negative feedback, that is, a partial opposition to the pressure increase in the tube 44, until the pressure equalizes in the auxiliary bellows 74 and 75. This momentary negative feedback moderates or smooths out pressure variations in the tube 44, thereby eliminating system oscillations, and increases system stability.

Referring now to Figures 2 and 3, the details of the feedback system are here shown. The abutments 76 and 77 for the bellows 74 and 75 may be arms of a U-shaped bracket 86, the arm 77 being extended to form an abutment 84 supporting the feedback bellows 83. The connector 82 may be in the form of a lever, the left end of which is held between the adjacent ends of the bellows 74 and 75, and the right end of which is connected to a post or pillar 87 upstanding from the top of the feedback bellows 83. The lever 82 is suitably connected to the top of this post 87, as by means of a screw 88. The tube 78 is connected to the lower or "free" bellows 75 through a tube 81 and to the upper or "restricted" bellows 74 through constricted tube portion or restrictor 79. The feedback bellows 83 is connected to the relay 45 through tube 44 by means of tube 85.

In the embodiment of Figure 4, the "free" bellows 75b is shown positioned above the "restricted" bellows 74a, both of said bellows, as in the preceding embodiment, being mounted on and between the arms 76a and 77a of a mounting bracket 86a. As distinguished from the preceding embodiment, the feedback bellows 83a is mounted beneath the tandem-arranged bellows 75a and 74a, the fixed abutment and upper support therefor being at the lower surface of the arm 77a. The driving connector for the feedback bellows 83a in this instance is a pair of links 82a, opposite ends of which are respectively connected as by screws 88a to a driving plate 89 between the bellows 75a and 74a and a plate 91 connected to and supporting the lower end of the feedback bellows 83a.

The operation of this embodiment is similar to that of the preceding embodiment. That is, air is supplied to the auxiliary bellows through tube 78 so that it differentially affects them due to the restrictor 79. Thus, initially, upon an increase in pressure in the tube 78, the connecting links 82a are pushed down, expanding the feedback bellows 83a, and effecting a decrease in pressure in the tube 85 connected to the relay 45 through tube 44 as in the preceding embodiment. Of course, upon a decrease in pressure in the tube 78, a corresponding increase in pressure is effected in the tube 85 so that in any event the instantaneous pressure change in the tube 85 moderates, that is, momentarily opposes the instantaneous pressure change in the tube 44, until the pressure in the bellows 75a and 74a equalizes, thereby having an effect similar to that which was obtained in the first embodiment.

In the embodiment of Figure 5, the auxiliary "restricted" bellows 74b is shown disposed above the auxiliary "free" bellows 75b. Here the feedback bellows 83b is larger in diameter, annular, and contains the "free" bellows 75b. As in the preceding embodiment, the bellows are held between the arms 76b and 77b of a supporting bracket 86b. The lower arm 77b in this instance also supports the feedback bellows 83b. The "restricted" bellows 74b is connected to the tube 54 of this system through restriction 79, whereas the free bellows 75b is connected to the tube 54 through tube 78 without restriction. The feedback bellows 83b is as in the preceding embodiments connected to the low pressure line 44 by means of tube 85.

The operation of this embodiment is similar to that of the preceding embodiments, except that there is no necessity of having any links. The upward expansion of the "free" bellows 75b, prior to equalization of the pressures in the bellows 74b and 75b, results in the expansion of the feedback bellows 83b, due to direct upward pressure on the top plate 91 thereof by the upper end of the "free" auxiliary bellows 75b. On the other hand, upon reverse operation, that is, upon decrease of pressure in the tube 54, the top plate 91 is pushed down and the pressure in the feedback bellows 83b increased, by the lower end of the "restricted" bellows 74b, upon initial differential contraction of the bellows 75b. It is here pointed out that the auxiliary bellows 74b, 75b, are sealed against the atmosphere, that is, such bellows are completely closed except for the tube 78.

From the foregoing disclosure, it will be seen that we have provided pneumatic apparatus which is not only responsive to changes in a variable condition, but which is pneumatically maintained in balance. In the present instance, the return to the balanced condition is a return to substantially the initial flow of air between the cooperating nozzles. There is here also a negative feedback between a feedback bellows, of diameter the same or different from that of the auxiliary bellows, driven by one or more auxiliary bellows, and an air relay, which feedback inhibits oscillations which might develop during the operation of the device. From the above description it is apparent that the feedback bellows is actuated by the differential expansion and contraction between the tandom-arranged auxiliary bellows. Such differential action is obtained by restricting the flow of air into and out of one of auxiliary bellows at a rate which differs from that of the associated auxiliary bellows. While the drawings show a conventional restriction in the tube connected to one of the auxiliary bellows it will be apparent that a restriction may be provided in each of the tubes connected to the auxiliary bellows, the only essential requirement being that such restrictions be of different size. The restrictions may take the form of adjustable valves or may be an inserted length of reduced-diameter tube. In any case, a desired system response can be obtained by adjusting the restriction.

Having now described our invention in detail, in accordance with the requirements of the patent statutes, various changes and modifications will suggest themselves to those skilled in the art, and it is intended that such changes and modifications shall fall within the scope and spirit of the invention, as recited in the following claims.

We claim:

1. A pneumatic system comprising an air line, a member movable in response to changes in a variable condition and producing corresponding air pressure variations in said air line, a second air line, a primary bellows actuated by the air pressure variations in the second air line, an auxiliary bellows system pneumatically coupled to the primary bellows, and a feedback bellows movable by the auxiliary bellows system and connected by a tube to the first air line.

2. The invention as recited in claim 1, wherein the said auxiliary bellows system comprises a pair of axially-disposed bellows one of which is pneumatically coupled to the primary bellows through an air restriction, and a mechanical coupling between the feedback bellows and the adjacently-disposed ends of the said axially-aligned bellows.

3. The invention as recited in claim 2, wherein the feedback bellows encloses one of the axially-aligned bellows.

4. A pneumatic system comprising an air line, a member movable in response to changes in a variable condition and producing corresponding air pressure variations in said air line; a second air line, an air relay having an operating chamber connected to the said air line, said air relay producing corresponding air pressure variations in said second air line; a pair of axially-aligned bellows having their outer ends confined against axial movement; means pneumatically connecting one of the axially-aligned bellows to the said second air line; means pneumatically connecting the other axially-aligned bellows to the second air line through an air restriction; a connecting member movable in accordance with the combined axial movement of the axially-aligned bellows; and a feedback bellows having one end fixed and the other end mechanically coupled to the said connecting member, said feedback bellows being pneumatically coupled to the chamber of the air relay.

5. The invention as recited in claim 4, wherein there is a rigid supporting member having spaced arms, the said axially-aligned bellows are supported between said spaced arms, and one end of the said feedback bellows is secured to one of said arms.

6. The invention as recited in claim 5, wherein the feedback bellows is aligned with the said axially-aligned bellows, and wherein the feedback bellows is mechanically coupled to the connecting member by a pair of rigid arms spanning the feedback bellows and one of the axially-aligned bellows.

7. The invention as recited in claim 5, wherein the said feedback bellows encloses one of the said axially-aligned bellows.

8. In a self-balancing pneumatic system of the type comprising an air stream flowing between a discharge nozzle and an axially-aligned receiving nozzle, a vane movable in the air stream, an air relay connected to the receiving nozzle and having a diaphragm movable in accordance with air pressure variations in said receiving nozzle, an air line, means actuated by the diaphragm and correspondingly varying the air pressure in said air line, and mechanism responsive to air pressure variations in the air line to maintain the vane at a predetermined position in the air stream; the improvement comprising a primary bellows pneumatically connected to the said air line; said mechanism including means coupling to it the primary bellows; a pair of axially-aligned auxiliary bellows pneumatically connected to the said air line, one of the axially-aligned bellows being connected to the air line through an air restriction; a feedback bellows pneumatically connected to the said receiving nozzle; and means driving the feedback bellows upon movement of the auxiliary bellows, said feedback bellows being effective to change the air pressure acting on the relay diaphragm in a sense opposite to the air pressure variation in the said receiving nozzle.

9. A bellows assembly for use in a pneumatic system comprising a closed bellows assembly having a tube communicating with the interior thereof, a rigid bracket member with arms supporting therebetween said bellows assembly, a feedback bellows also supported by said bracket member, and means for driving said feedback bellows from said bellows assembly, said feedback bellows also having a tube communicating with the interior thereof.

10. The invention as recited in claim 9, in which the closed bellows assembly is formed as two bellows, in which the tube of one only of said bellows is restricted, and in which the connection with the feedback bellows is in the form of a lever, one end of which is sandwiched between the two bellows and the other end of which is connected to one end of the feedback bellows.

11. The invention as recited in claim 9, in which the feedback bellows is disposed in engagement with an outer surface of one of the supporting bracket member arms and driven from the bellows assembly by means of links.

12. The invention as recited in claim 9, in which the bellows assembly is formed as two bellows, a driving plate disposed between said bellows, and links for driving the feedback bellows connected to said driving plate.

13. The invention as recited in claim 9, in which the feedback bellows is of larger diameter than and encloses a portion of the bellows assembly.

References Cited in the file of this patent

UNITED STATES PATENTS

| | | |
|---|---|---|
| Re. 23,723 | Allwein | Oct. 13, 1953 |
| 2,169,982 | Manteuffel | Aug. 15, 1939 |
| 2,285,540 | Stein | June 9, 1942 |
| 2,330,654 | Ziebolz | Sept. 28, 1943 |
| 2,332,627 | Erbguth | Oct. 26, 1943 |
| 2,409,871 | Krogh | Oct. 22, 1946 |
| 2,431,297 | Moore | Nov. 18, 1947 |
| 2,588,622 | Eckman | Mar. 11, 1952 |
| 2,688,334 | Jewett | Sept. 7, 1954 |
| 2,737,964 | Olah | Mar. 13, 1956 |
| 2,746,296 | Stover | May 22, 1956 |
| 2,755,813 | Farrington | July 24, 1956 |
| 2,838,028 | Erbguth | June 10, 1958 |

FOREIGN PATENTS

| | | |
|---|---|---|
| 568,634 | Great Britain | Apr. 13, 1945 |

OTHER REFERENCES

"Fundamentals of Automatic Control" (pages 264–271) by G. H. Farrington, published 1951 by Chapman, Hall Ltd., London Scientific Library No. TA165F3.